United States Patent [19]
Fourrey

[11] 3,746,389
[45] July 17, 1973

[54] FOLDING SEATS FOR AUTOMOTIVE VEHICLES
[75] Inventor: François Fourrey, Billancourt, France
[73] Assignee: Regie National Des Usines Renault, Billancourt, France
[22] Filed: Feb. 16, 1971
[21] Appl. No.: 115,334

[52] U.S. Cl. ............................ 297/15, 297/379
[51] Int. Cl. ............................................ B60n 1/02
[58] Field of Search ..................... 297/15, 14, 324, 297/378, 379, 359, 360, 324, 321, 380, 381; 5/43; 296/66, 69

[56] References Cited
UNITED STATES PATENTS
| | | | |
|---|---|---|---|
| 3,550,949 | 12/1970 | Bonnand | 297/379 X |
| 2,926,949 | 3/1960 | Himka | 297/321 X |
| 2,997,335 | 8/1961 | May | 296/66 |
| 2,418,787 | 4/1947 | Nelson | 296/66 X |
| 2,547,446 | 4/1951 | Dean | 5/43 X |
| 1,947,980 | 2/1934 | Feyrer | 297/15 X |
| 2,859,798 | 11/1958 | Carte | 297/321 |
| 2,644,170 | 7/1953 | Kelly | 5/43 |

Primary Examiner—Francis K. Zugel
Attorney—Stevens, Davis, Miller & Mosher

[57] ABSTRACT

This folding seat structure constituting an auxiliary seat is foldable against an element of the body and comprises a backrest with a shaft axis and seat cushion fulcrumed about this axis, and a mechanism of which the component elements fulcrumed about suitably located axes assist in locking the backrest; at least one pivoted member of the locking mechanism rigid with the backrest and co-acting by means of its cranked end with a retaining member for locking the backrest carries an arm pivoted to a link connecting said arm to a cushion provided with a fulcrum pin for pivoting said link, the arrangement being such that the backrest is locked when it is actuated towards its operative position, and released when the cushion is lifted.

8 Claims, 7 Drawing Figures

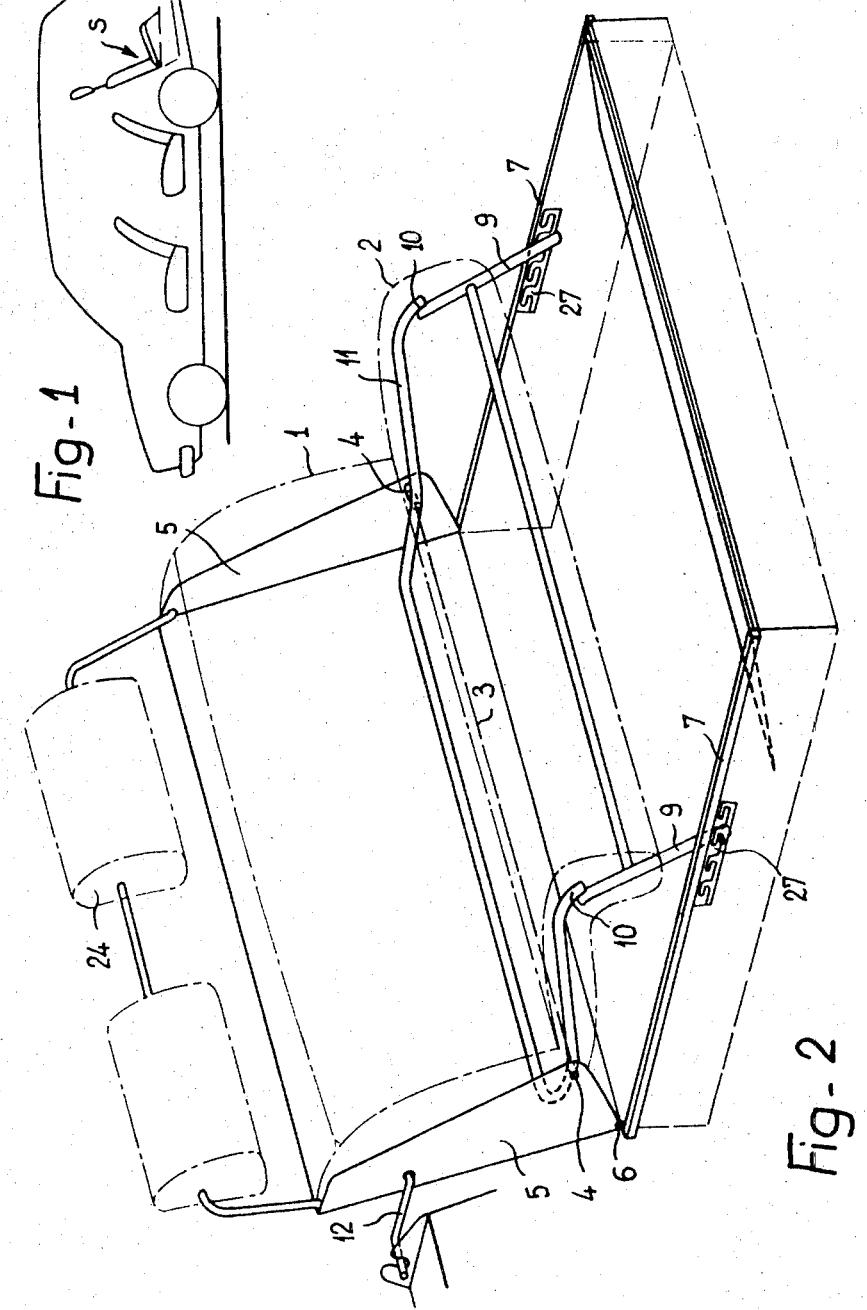

FOLDING SEATS FOR AUTOMOTIVE VEHICLES

The present invention relates in general to seating of motor vehicles and has specific reference to locking and release mechanisms of auxiliary or emergency folding seats of automotive vehicles, applicable more particularly to folding seats of estate cars or station wagons, which seats are adapted to be utilized notably in the rear compartment or luggage space of the vehicle, notably for seating children.

Auxiliary or emergency seats of motor vehicles are already known which comprise a backrest provided with means for locking same in its operative position. However, in many instances it is found that unfolding and locking this seat in this operative position constitutes a tedious and time-robbing operation for the locking action is performed manually on a backrest seldom accessible from the "fifth" or back door of the vehicle. Another known inconvenience of these folding seats is that the excessive dimensions of the locking members and their poor accessibility require in most cases complementary maneuvers for folding the backrest before pivoting or folding the cushion.

On the other hand it is known that collapsible or folding seats do not warrant the same comfort as the other seats of a vehicle. This lack of comfort is due mainly to the insufficient elasticity of the seating and to its moderate thickness which are both necessary for facilitating the seat folding operation.

It is the essential object of this invention to provide a folding device which means for automatically locking the backrest when unfolding the cushion by simply pivoting the backrest proper. It is another object of this invention to provide means for automatically releasing the backrest and retracting the backrest retaining members by actuating only the seat cushion.

This invention further contemplates the possibility of unfolding or folding the seat without necessarily penetrating into the vehicle, for example by using a single door thereof.

It is another, complementary object of the present invention to provide a comfortable seat comprising a cushion of moderate thickness.

In addition, this invention is designed to provide a specific arrangement of the floor structure of the vehicle in order to house therein the complete seat with its head-rests and convert automatically a floor element into a footrest when the seat is unfolded to its operative position.

The seat according to this invention, which comprises a backrest provided with a first fulcrum pin, a cushion movable about this axis, a second fulcrum pin rigid with the vehicle for pivoting the backrest, a mechanism having hinged members pivoted about separate fulcrum pins carried by the seat backrest and cushion, said hinged members being adapted to co-act in the operative seat position for locking said backrest and cushion in their operative positions with respect to certain elements of the vehicle body, is characterized in that at least one hinged member of said mechanism, which is rigid with the backrest, carries the fulcrum pin of a link connecting said hinged member to a cushion element, said last-named cushion element further comprising a fulcrum pin for said link, the relative arrangement of the hinged members being such that the seat is locked in its operative position when the backrest is actuated towards this operative or erected position and released when the cushion is lifted.

Other features characterizing this invention will appear as the following description proceeds with reference to the accompanying drawings illustrating diagrammatically by way of example a folding seat structure according to this invention.

In the drawings:

FIG. 1 is a very diagrammatic longitudinal section showing a vehicle, in this case an estate car or station wagon, provided with an auxiliary or emergency seat, in order to illustrate the seat position in the general body structure;

FIG. 2 is a perspective view of the seat in its operative position;

Figure 3:
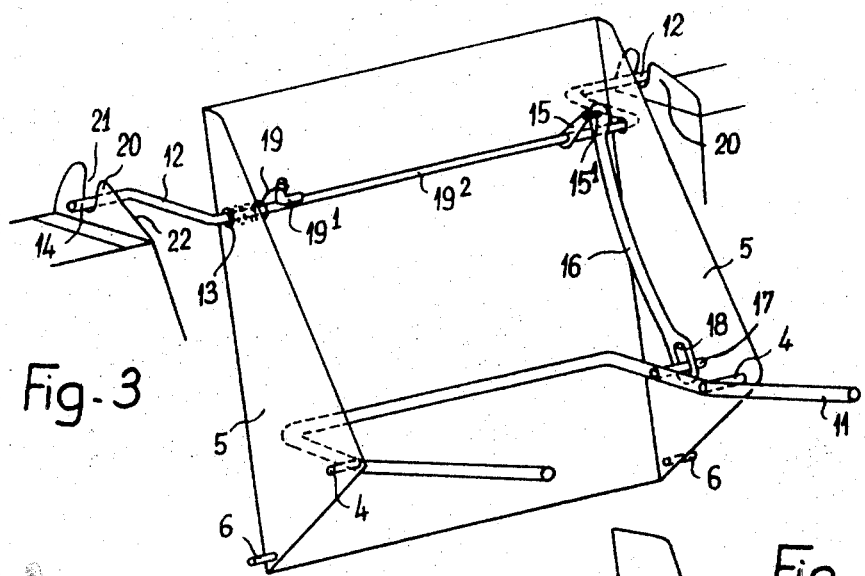
FIG. 3 is a perspective view of one portion of the mechanism in its operative position.
Figure 4:
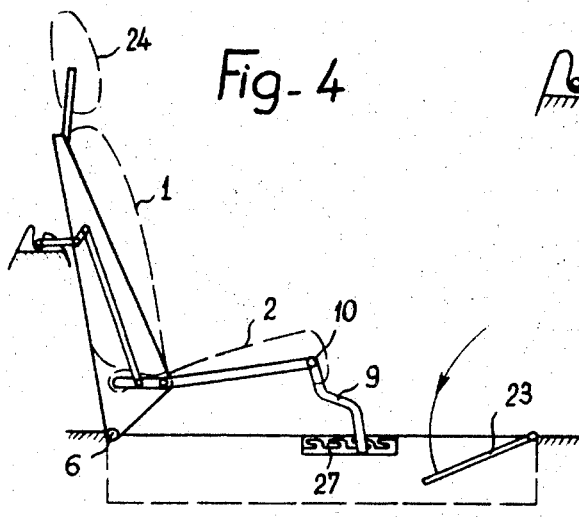
FIG. 4 is a side elevational view of the seat in its unfolded or operative position.

Referring first to FIG. 1, the folding or fold-down auxiliary or emergency seat $s$ is positioned in the rear portion of the vehicle.

In FIG. 2, the folding seat shown in its operative or erected position comprises a backrest 1 and a cushion 2 pivoted about a first imaginary axis 3 of said backrest and actually consisting of a pair of small fulcrum pins 4 rigid with side plates 5 of the backrest structure and carried by the tubular frame 11 of the cushion. The backrest 1 is pivoted about a second pivot axis consisting of fulcrum pins 6 engaging holes formed in section members 7 rigid with the lateral walls of the vehicle body.

The mechanism controlling the movements of the seat members comprises legs 9 pivotally connected through fulcrum pins 10 carried by the tubular frame 11 of the seat cushion and a fulcrum rod $19^2$ with cranked arms 12 trunnioned in bearings 13 of the backrest supporting side plates 5 (FIG. 3). According to this invention, at least one of said cranked arms 12 co-acts with its cranked end 14 for locking the backrest 1 in its operative position and said fulcrum rod $19^2$ carries a radial arm 15 fulcrumed at fulcrum pin $15^1$ to a link 16 connecting said arm 15 to the tubular frame 11 of the cushion (see FIGS. 3 and 6). A fulcrum pin 17 (FIG. 3) rigid with frame 11 bears against the bottom of an elongated or oval hole 18 formed in the link for a purpose to be explained presently.

A spring 19 (FIG. 3) mounted between the arm 12 and the supporting side plate 5 has one end secured to the plate 5 and the other end secured to a small radial arm $19^1$ of an element 19 welded or otherwise secured to the fulcrum rod $19^2$ interconnecting the arms 12. This spring 19 urges the arm 12 to its backrest locking position. Members 20 adapted to retain the backrest 1 in its locked position are provided with a notch 21 and an inclined guide face 22 for a purpose also to be explained presently.

Figure 6:
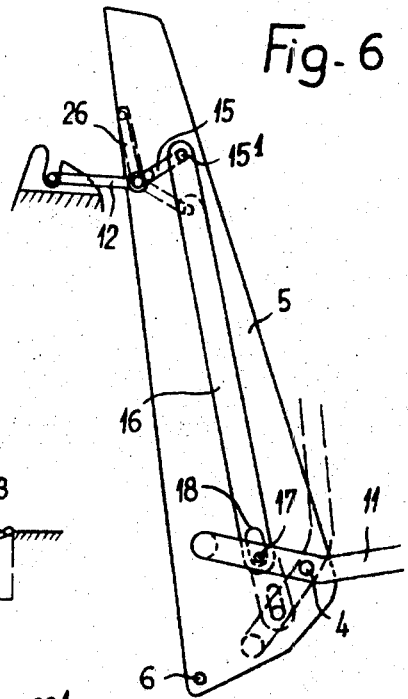
FIG. 6 is a side elevational view of the mechanism in its operative position.
Figure 5:
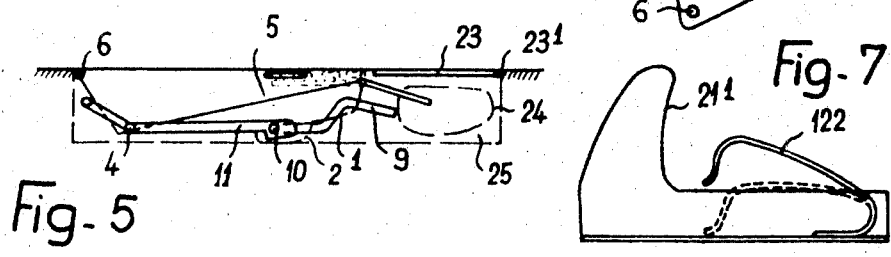
FIG. 5 is a side elevational view of the seat folded and housed within a recess provided to this end in the floor structure of the vehicle.

The complete seat is shown in its retracted or concealed position in FIG. 5. In this position the seat is contained completely in a recess 25 provided to this end in the floor structure of the vehicle. A footrest 23 pivoted at 23¹ is mounted to the corresponding transverse edge of said recess 25. The backrest 1 (of which one of the supporting side plates 5 is visible in FIG. 5) has been pivoted about the fulcrum pins 6 together with the headrests 24 rigid with said backrest. The cranked arms 12 then engage a recess 26 formed in the supporting side plates 5 of the backrest, as a consequence of the action produced by fulcrum pins 17 and link 16 (FIG. 6).

From the folded position illustrated in FIG. 5 the seat is unfolded to its operative position by first lifting the footrest 23 in order to permit the pivotal movement of backrest 1 with its headrests 24 towards the front of the vehicle (in the arrangement illustrated in FIG. 1). The cushion 2 is raised but remains in the floor recess 25 with its frame 11. During the forward movement of the backrest the arms 12 are pulled out from their recesses 26 of side plates 5 by the elastic action of the hitherto stressed spring 19, so as to abut against the inclined face 22 of retaining member 22.

To engage the cranked portion 14 of arm 12 into the notch 21 this arm 12 will be slightly rotated in the opposite direction as consequence of the action of said inclined face 22, thus counteracting the action of spring 19. As a consequence of this rotation the fulcrum pins 15¹ and link 16 will be moved downwards. The elongated hole 18 facilitates this movement of link 16 during the action of the inclined guide face 22.

Figure 7:
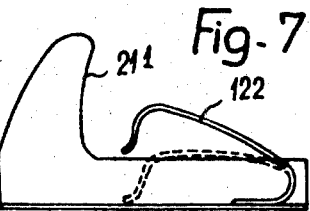
FIG. 7 is a modified form of embodiment of the retaining member.

According to a modified detail and without departing from the basic principle of the invention it will be seen in FIG. 7 that the retaining member 20 may be provided with a retractable guide face 122 adapted to yield downwards until the arm 12 abuts against the lug 21¹ of notch 21. This simplified arrangement eliminates the above-described downward movement of link 16 and permits of dispensing with the elongated hole 18 and spring 19.

After the backrest 1 has been properly positioned and locked the cushion 2 is adapted to the user's height by lowering the legs 9 and locking same in one of the notches 27 of the side section members 7 by means of a known system such as a bayonet connection.

It will readily occur to those conversant with the art that the auxiliary seat of this invention may provide a substantial degree of comfort in spite of its moderate thickness. This comfort may advantageously be obtained by tensioning a soft and resilient sheet between the lateral sections of frame 11; the tension of this sheet may be modified adjusting the cushion height.

What is claimed as new is:

1. An auxiliary folding seat for automotive vehicles, comprising
    a backrest section pivotally connected at its lower edge to the vehicle body;
    a seat section pivotally connected near its rear edge to said backrest section;
    said seat section supportable by a pair of supporting members pivotally connected to said seat section near its front edge of, and engageable with the vehicle body at points below the front edge of said seat section;
    a hinge mechanism comprising a fulcrum rod extending horizontally across said backrest section and rotatably mounted therein, the ends of said rod forming means for locking said backrest section in a substantially upright operative position, said rod having a fulcrum arm extending radially therefrom and pivotally connected to one end of a linking arm, the other end of said linking arm being pivotally connected to a side edge of said seat section, for releasing said rod from its locked position when said seat section is lifted.

2. The folding seat of claim 1 wherein the end of said linking arm pivotally connected to the edge of the seat section has an elongated aperture therein which is slidably engaged with a pin extending substantially horizontally from the edge of said seat section;
    the ends of said fulcrum rod comprise crank handles, each engageable with a cam-faced locking means attached to the body of the vehicle near the location of the upright position of said backrest section;
    and the crank arms are biased toward said locking means by a spring connected to said fulcrum rod and said backrest section.

3. The folding seat of claim 2 wherein the camming face of said locking means comprises a resilient, collapsible member which is adapted to retain said crank handles.

4. The folding seat of claim 1 wherein said backrest is pivotally connected to the vehicle body at a floor level therein, and said body comprises a well into which the entire folding seat is foldable to form a flat floor at said floor level.

5. The folding seat of claim 4 wherein the pair of supporting members pivotally connected to the seat section are engageable with said vehicle body at the sides of said well.

6. The folding seat of claim 4 wherein said backrest section also comprises headrest.

7. The folding seat of claim 6 additionally comprising a floorboard section pivotally mounted at said floor level at the edge of said well facing the front edge of said seat section, for alternate use as an inclined footrest and a floorboard covering for said headrests when said seat is in its folded position within said well.

8. The folding seat of claim 1 wherein said seat section comprises side members which are pivotally connected to said backrest section.

* * * * *

UNITED STATES PATENT OFFICE
CERTIFICATE OF CORRECTION

Patent No. 3,746,389      Dated July 17, 1973

Inventor(s) Francois Fourrey

It is certified that error appears in the above-identified patent and that said Letters Patent are hereby corrected as shown below:

On the cover sheet the assignee should read

-- Regie National Des Usines Renault, Billancourt, France and Automobiles Peugeot, Paris, France --.

On the cover sheet insert

- [30] Foreign Application Priority Data

Feb. 17, 1970      France      70/05620   --.

Signed and sealed this 1st day of October 1974.

(SEAL)
Attest:

McCOY M. GIBSON JR.
Attesting Officer

C. MARSHALL DANN
Commissioner of Patents